Oct. 11, 1938.   G. T. COOKE   2,132,779
COUPLING AND LOCK
Filed June 12, 1936   3 Sheets-Sheet 1
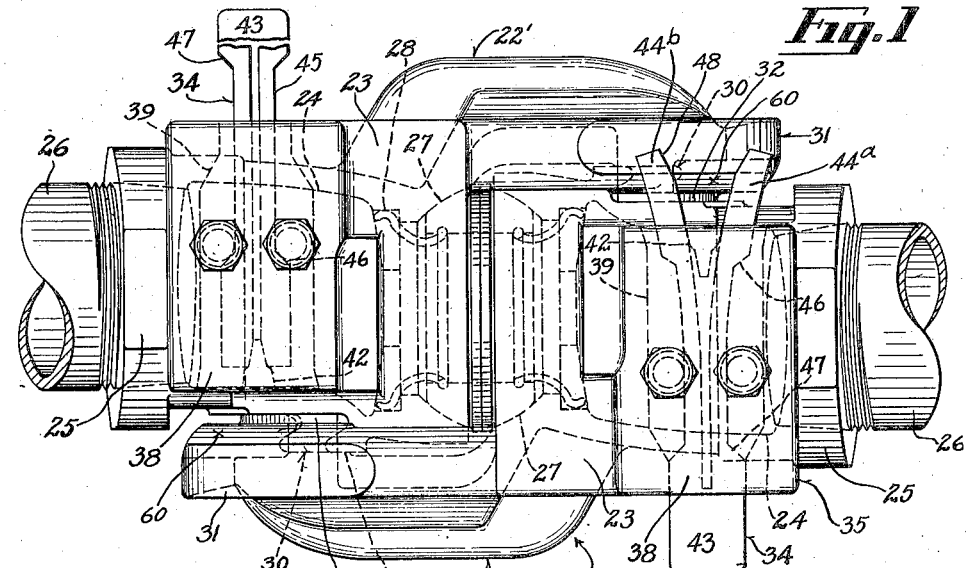
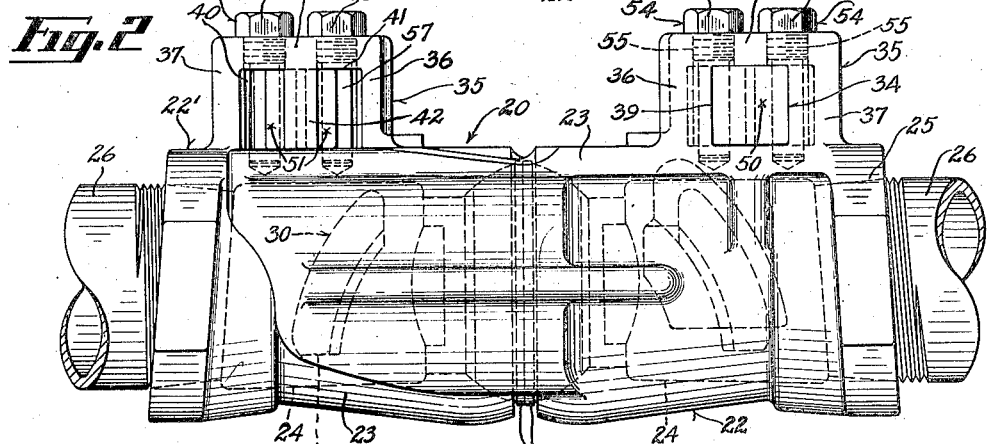
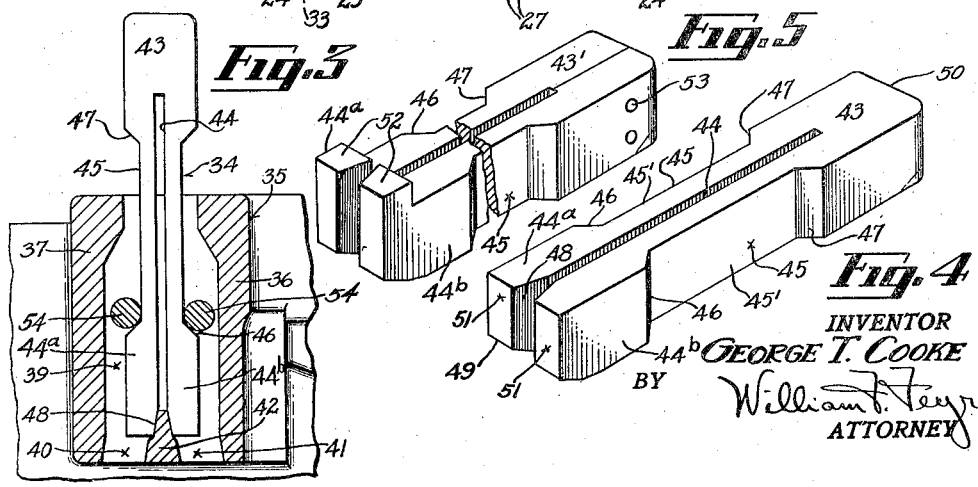
INVENTOR
GEORGE T. COOKE
BY
William T. Teyner
ATTORNEY Oct. 11, 1938.   G. T. COOKE   2,132,779
COUPLING AND LOCK
Filed June 12, 1936   3 Sheets-Sheet 2
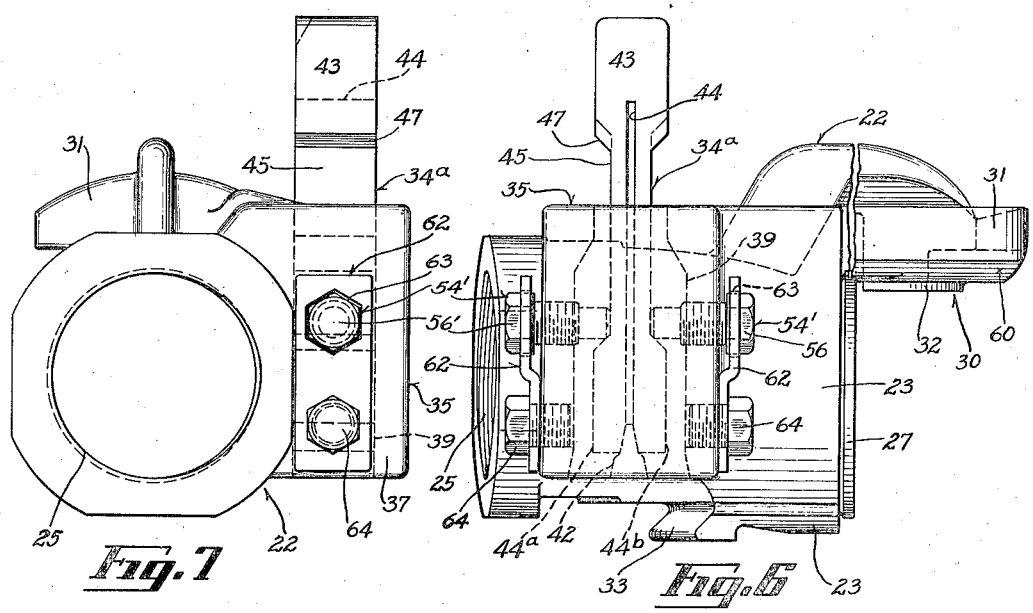
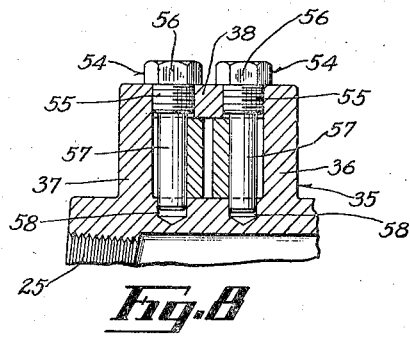
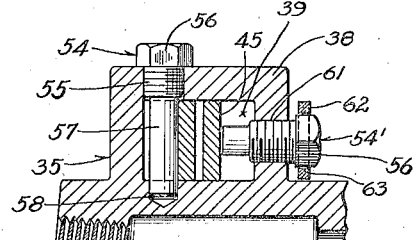
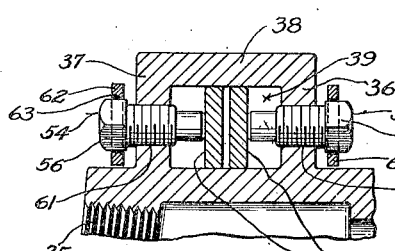
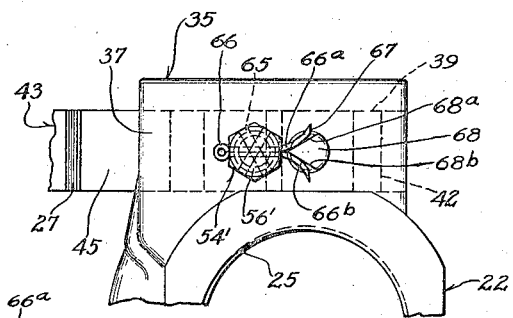
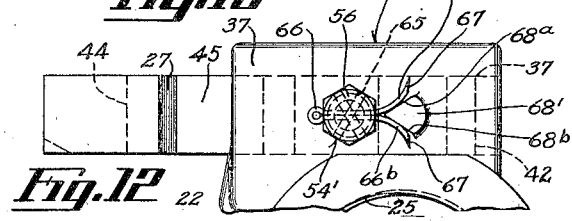
INVENTOR
GEORGE T. COOKE
BY
William F. Feyrer
ATTORNEY

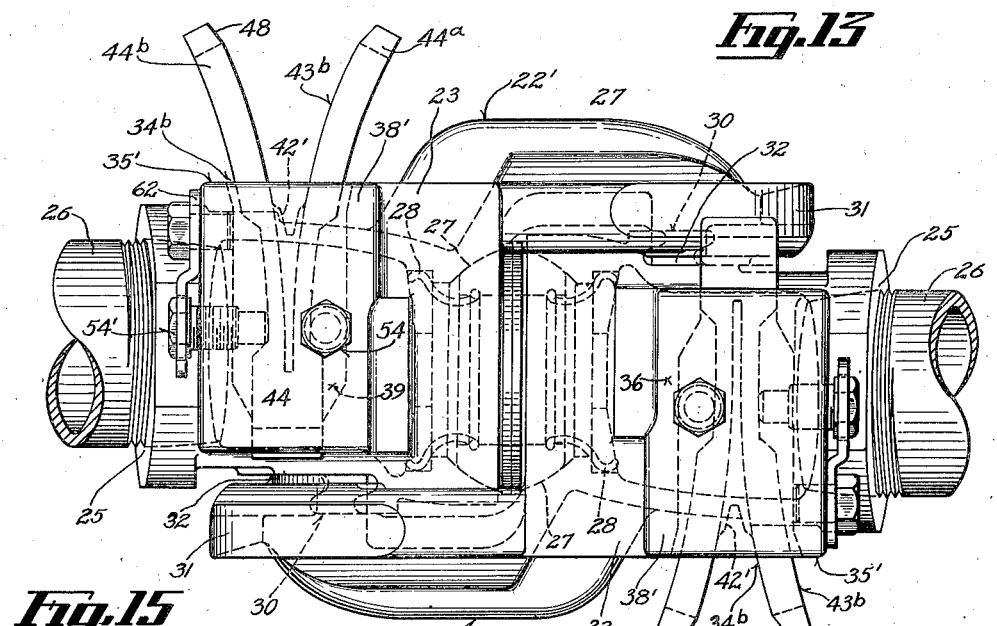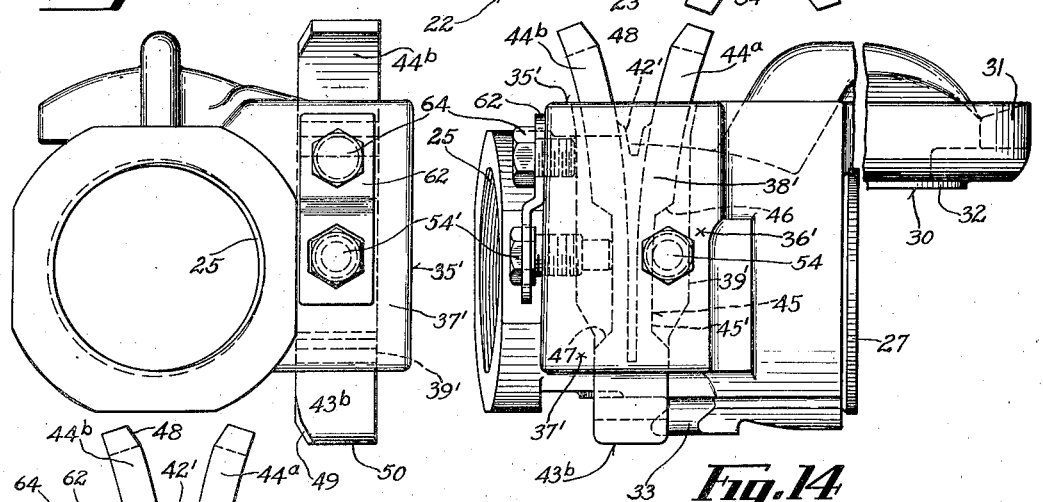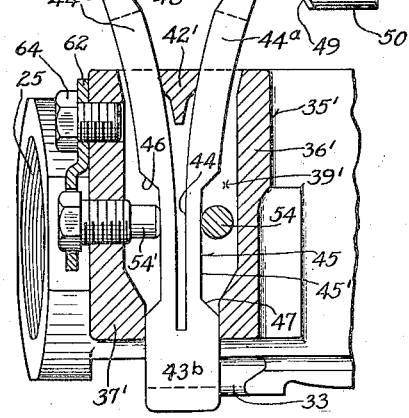

UNITED STATES PATENT OFFICE 2,132,779

COUPLING AND LOCK

George T. Cooke, South Norwalk, Conn., assignor to American Railway Products Company, Inc., South Norwalk, Conn., a corporation of New York Application June 12, 1936, Serial No. 84,864

9 Claims. (Cl. 285—68)

The present invention relates to improvements in couplers for hose or pipe ends, and especially couplers of the type commonly used to detachably connect the hose ends or flexible end connections of the train pipes for railway cars.

Particularly, it relates to improvements in the couplers shown in my Patent No. 2,039,058, issued on April 28, 1936, which discloses a novel and highly efficient coupler.

It is a primary object of the present invention to provide a coupling, similar to that disclosed in my aforesaid patent, which will be sturdy and very economical to manufacture. In my aforesaid invention the structure was such that it was necessary to provide a special form of open housing with a removable cover piece, the latter in its strongest form being held in place by four separate screws. While this structure works very satisfactorily it is somewhat costly, and accordingly it is one of the primary aims of the present invention to provide a more economical structure.

A feature flowing from the attainment of this object is the provision of a housing having side walls and a top, all integral with the main body of the coupling, with other cooperating structure which permits the insertion and removal of a reciprocatory and expanding key member without the necessary use of a removable cover.

Couplings of the type here involved are subjected to considerable vibration during regular use and consequently it is highly important that any locking means provided remain securely in the locking station, otherwise the coupling heads loosen relatively to each other and cause an adverse leakage of steam, air, or the like.

Accordingly, it is an object of the present invention to provide a coupling head, and especially locking means therefor, which will positively remain in the locked position even though it is subjected to considerable vibration.

A feature resulting from the attainment of this object is the provision of a structure which sturdily grips and maintains the locking member in the advanced or locked position.

With many of the couplers of certain types now in extensive use the locking member is subjected to considerable wear and to a certain bending or folding back from the locking point; and, there is absolutely no provision for compensating for the wear and for the bending or folding back of the locking member. As a result of these adverse factors coupling heads are very often improperly or insecurely brought together, even though the trainman conscientiously moves the locking member into its fullest advanced position. Any failure to bring the coupling heads together fully results in an adverse leakage, and any such leakage results in adverse wear to the gaskets between the coupling heads. These factors are so prevalent that in just one railroad system many thousands of wooden wedges were provided during a single season in an effort to compensate for the same and to prevent such leakage.

It is a highly important object of the present invention to provide a locking means for coupling heads which will not bend or fold back, and particularly one which is capable of adjustment from time to time to compensate for wear so that it will always sturdily hold the mating coupling parts in the locked position.

The feature resulting from the accomplishment of this object includes the provision of one or more pressure members which are adjustable. In one form this structure includes a vertically disposed stud extending from the top of the housing into the body of the coupling head against which an expansible locking member is pressed by a horizontally disposed screw stud, the latter being adjustable in order to clamp or hold the expansible member with any desired degree of pressure and to compensate for wear thereof from time to time. In its preferred form, however, two such horizontally disposed screw studs are provided, to furnish a plurality of adjustable pressure members.

Also, in some forms of coupling heads heretofore proposed and used a bolt was provided as a pivot point for the pivoted main locking member and a loosening thereof would occur during the many movements of the pivoted locking member into advanced and retracted positions each time the coupling was connected to a new part.

It is an important object of the present invention to provide coupling heads in which such adverse loosening of the parts cannot occur.

A feature flowing from the attainment of this object includes, in one form, the provision of a special locking plate which sturdily holds the adjustable pressure member in any desired station, and in another form includes the provision of a cotter member in the pressure member and a novel wedge member on the coupling head adapted to automatically open or spread the cotter member after the pressure member is properly adjusted; the association of the spread cotter and wedge member serving to positively and strongly hold the pressure member in its adjusted position.

Since it is highly important to hold the mating coupling heads in the coupled or locked-together position it is very desirable to provide a locking member therefor which will remain in the operative position under most adverse conditions, viz., with the swinging movements of the associated pipe conduit and in spite of the natural vibration of the train and interconnecting parts of the coupler. It is an object of the present invention to accomplish this desiderata.

A feature resulting from the accomplishment of this object is the provision of a locking means which has the characteristic or tendency of moving toward the advanced or locking position, rather than toward the retracted or unlocked position when subjected to the aforesaid swinging and vibrating, and which has the characteristic of requiring greater force in order to move it to the unlocked than to the locked position.

It is a highly important object of the present invention to provide a coupling head which may be easily and very economically manufactured.

Other objects, features, and advantages will appear hereinafter.

In the drawings, which illustrate the present preferred embodiments of the invention:

Figure 1 is a top plan view of a pair of coupling heads made in accordance with the present invention, with the locking member of one coupling head in retracted position and with the locking member of the other head in the advanced position.

Fig. 2 is a side view of the coupling head shown in Fig. 1.

Fig. 3 is a fragmentary view of the housing and locking member in the retracted position.

Fig. 4 is a perspective view of one form of locking member.

Fig. 5 is a fragmentary perspective view of a modified form of locking member.

Fig. 6 is a top plan view of only one coupling head, similar to the head shown in Fig. 1, but with a modified form of pressure member.

Fig. 7 is an end view of the coupling head shown in Fig. 6.

Fig. 8 is a fragmentary sectional view of the pressure members disclosed with the coupling heads of Figs. 1 and 2.

Fig. 9 is a fragmentary sectional view, similar to Fig. 8, which shows a modified arrangement of pressure members.

Fig. 10 is a fragmentary sectional view, similar to Figs. 8 and 9, but shows the pressure member structure of that form of the invention disclosed in Figs. 6 and 7.

Figs. 11 and 12 are fragmentary views of locking structure provided by the present invention to hold the pressure members in various adjusted positions.

Fig. 13 is a top plan view, similar to Fig. 1.

Fig. 14 is a top plan view of a single coupling head, of the modified form shown in Fig. 13.

Fig. 15 is an end view of the coupling head shown in Figs. 13 and 14.

Fig. 16 is a fragmentary sectional view of the housing and locking member, of that form of the invention shown in Figs. 13 through 15.

Referring now in detail to the drawings which show the present preferred embodiments of the invention, the simplest form of the invention shown in Figs. 1 through 5 will be described first. Therein the invention is disclosed as comprising a coupling 20 with counter-part mating coupling heads 22 and 22', each having a main body 23 with an integral bore 24, with a screw thread or like connection 25 at its outer end for receiving a pipe 26. The inner end of the bore 24 is provided with a gasket 27 held in place by spring clips 28. The gasket and gasket holding connection may be of any of the now well-known forms used regularly in couplings of this type. Likewise, even though a thread connection 25 and solid pipe 26 are shown, it will be fully appreciated that any other usual connection may be employed, and that hose, flexible metal conduit and the like may be used.

The coupling heads 22 and 22' are shown as provided with the now well known and much used form of main connection 30 used generally with this class of couplings comprising on each head, a connection arm 31 projecting beyond the face of the gasket 27 and adjacent the main body 23 of the mating coupling head in order to align the two. Each of the arms is provided with an eccentric connecting hook 32 engaging and cooperating with lugs 33 on the sides of the main body 23 to permit a slight separation between the two gaskets when the coupling heads are initially moved toward the closed position and to gradually move inner ends of the couplings toward each other and to concurrently move the gaskets 27 into firm face-to-face contact as the heads are moved to the final closed position shown in Figs. 1 and 2.

The major difficulty prevalent with couplings, especially those used on railroads, has been the problem of effectively holding or locking the mating coupling heads in the closed position, and to prevent them from becoming loosened relative to each other during swinging movements of the associated parts and normal vibration prevalent in the use of this type of equipment on railroads. Any loosening thereof results in the escape of steam, air, or the like which lowers the efficiency of both the engine and the cars and because of the location of such couplings between cars and near the platforms thereof causes much inconvenience.

Heretofore a number of different structures have been proposed to lock the mating coupling heads in the closed position, and to overcome prevalent adverse factors, some of which have hereinbefore been set forth. While most of these previous proposals work satisfactorily when new, there is no structural provision whereby wear or bending of the locking parts may be compensated for. Also many of these previous proposals were for costly structures.

The present invention provides a novel and highly advantageous coupling with a very efficient locking mechanism. In its simplest form, illustrated in Figs. 1 through 5, the present invention provides a locking mechanism 34 including a housing 35 preferably made integral with the main body 23 having side walls 36 and 37 and an integral top 38 forming an enclosed main channel 39 and a pair of subsidiary channels 40 and 41 formed by a wedge 42, said channels being adapted to receive an expansible locking member 43.

Fig. 4 shows the present preferred expansible locking member 43 comprising a single rectangular block having an elongated slot 44 near the center forming legs 44a and 44b, and each of the latter being preferably provided with reduced portions 45 having walls 46 and 47 at opposite ends thereof. Preferably bevels 48 and 49 are provided at the foward end thereof. Heads 50 and 51 are provided at opposite ends of the expansible locking member to receive hammer blows.

A modified form of expansible locking member

43' is shown in Fig. 5 which is the same as the form shown in Fig. 4 and just described in detail differing only in the optional provision of top lugs 52 and that it is of a split one-piece construction with the legs secured together as by rivets 53.

Referring now to Fig. 1, at the left side, the expansible locking member 43 may be assembled to the housing 35 of the coupling head 22' by merely sliding it into the main channel 39 from the rear end thereof until the bevels 48 engage the wedge 42.

When the expansible locking member 43 is in this position, according to this form of the present invention a pair of pressure members 54 in the form of screw studs with a threaded section 55 hexagon head 56 and shank 57 are passed into the top 38 through the main channel 39 and into suitable holes 58 in the main body, adjacent the reduced sections 45 of the expansible locking member 43, (see Figs. 3 and 8).

These pressure members 54 serve to press the legs 44a and 44b firmly into engagement with the wedge 42 and to maintain the locking member in both the advanced and retracted positions shown respectively at the right-hand and left-hand sides of Fig. 1 on heads 22' and 22. Walls 46 and 47 at the ends of the reduced portions 45 effectively limit movement of the member 43 into the retracted and advanced positions and lock the member 43 to the coupling head.

When the head 50 of the member 43 is struck by a hammer or the like legs 44a and 44b are spread relative to each other creating a pressure on the wedge 42 which holds the expansible locking member in various adjusted positions and concurrently bottoms 45' of the reduced portions 45 are pressed more firmly against the pressure members 54 to strongly hold the member in the desired position. During movement of the member 43 from retracted to advanced position the bevel 49 thereon engages with a bevel 69 on the arm 31 to tighten the main connection 30 and to move and hold the faces of the gaskets 27 in a fully closed position.

That form of the present invention just described in detail provides a structure which may be manufactured very economically, and provides a very sturdy construction even though comparatively light weight parts are used, which is of course always desirable in railroad equipment. The removable pressure members 54 make possible the use of an integral housing, which is of course more sturdy and economical than the structures in my aforesaid patent and makes possible the easy replacement of worn pressure members which is not possible in said earlier structures.

Without depreciating the aforesaid advantages in this new form of coupling of the present invention, and just described in detail, it is not possible to alter the pressure points in any way to compensate for irregularities in the shape of the wedge 42 or the like during casting or machining, to compensate for various degrees of temper in the expansible locking member 43, or to take up wear or yield in the expansible member 43 or to take up wear on the pressure members 54 or the wedge 42.

Figures 6, 7, 9, 10, 11, and 12 disclose a modified form of the aforesaid invention, however, in which the advantages of the first form of this invention are still obtained and in addition the just mentioned shortcomings are mastered, with a modified form of locking mechanism 34a.

In its highest developed construction this modified form of the invention comprises the same main body 23 and integral housing 35, and makes use of the same expansible locking member 43. The main point of difference is the provision of horizontally rather than vertically disposed, pressure members 54' screw threaded into suitable threaded holes 61 in the side walls 36 and 37 of the housing to engage with the reduced portions 45.

Thus, before the pressure members 54' are added or brought into a close position, it is possible to pass the expansible member 43 (or 43', if the lugs 52 are not thereon) into the main channel 39 to the position shown in Figs. 6 and 7 thereafter the pressure members are adjusted to press against the bottoms 45' of the member 43 and to press the bevel 48 and the legs 44a and 44b against the wedge 42, in much the same manner as the pressure members 54. However, with the modified form just described it is possible to obtain various degrees of pressure and it is not necessary to have the wedge 42, main body 23, or the expansible member 43 cast or machined within very close limits. This latter factor also reduces the manufacturing cost. It has the further decided advantage of enabling adjustments to be made from time to time to compensate for wear.

In order to lock the members 54' in the desired position as shown in Figs. 6, 7, 9, and 10 the present invention provides a locking plate 62 with a cut out 63 adapted to pass over or around the head 56, held in position on the body 23 by a screw 64. Preferably a locking plate 62 is provided for each of the pressure members 54'.

A preferred structure for locking the pressure members 54' in various adjusted positions includes the provision of a plurality of holes 65 in the head 56 of the pressure member 54' (or of the vertically disposed member 54) and a cotter member 66, preferably with the bevelled ends 67 and a wedge 68 on the body 23. With this latter structure it is merely necessary to adjust the pressure member any desired amount, aligning one of the holes 65 with the wedge 68. Next the cotter member 66 is passed into the aligned hole and driven toward the wedge 68 whereupon the bevels 67 and the wedge cooperate to spread legs 66a and 66b of the cotter member into the opened or locking position shown in Fig. 11. The legs 66a and 66b engaging walls 68a and 68b of the wedge 68 absolutely prevent the pressure member 54, or 54', from turning in either direction.

As shown in in Fig. 11, the wedge 68 is in the form of a hardened insert secured to the housing 35 part of the body. If preferred, and for economy, it may be cast integral with the body; such a modified wedge 68' being shown in Fig. 12.

If preferred, and as shown in Fig. 9, the one vertically disposed pressure member 54 and one horizontally disposed pressure member 54' may be provided. With such a structure only one, the member 54', may be used to effect the advantageous adjustments and to compensate for wear, as just previously described. Also, referring to Fig. 9, the vertically disposed pressure member 54 may be in the form of a lug cast integral with the body 23 when the horizontally disposed pressure member 54' is provided. However, this is less advantageous since it cannot be replaced when worn.

Figs. 13 through 15 show a further modified form of the present invention, similar in many respects to the two main forms already described in detail, comprising a main body 23 and main connection 30. However, it differs mainly in the provision of a modified form of housing 35' and modified locking mechanism 34b wherein an expansible member 43b is reversed so that it is more sure to remain in the locked position.

To this end, the form of the present invention now considered includes a housing 35' with side walls 36' and 37', and a top 38' forming a main channel 39' with a wedge 42', at the rear rather than the front of the housing 35'. A locking member 43b, similar to members 43 and 43' except for the provision of the bevel 49 at the head end 50 rather than end 51, is passed into the housing 35' from the front of the housing so that the single thick or sturdier part thereof takes the main load in the locking position, and more particularly so that the wedge 42' in spreading the legs of the expansible locking member 43b normally urges it toward the arm 31 of the mating coupling head 22, or at least to increasingly restrain movement of the expansible locking member rearwardly or toward the retracted position as the legs thereon are moved rearwardly on the wedge 42'. Otherwise operation of this form of the invention is the same as the forms hereinbefore described in detail.

As shown in Figs. 13 through 16, this form of the invention may be provided with one vertical pressure member 54 and one horizontal pressure member 54'. However, either two vertical pressure members 54 or two horizontal pressure members 54' may be provided if preferred, as will be readily understood from the detailed description of these other arrangements previously described in detail. The expansible locking members 43b may be provided with reduced portions 45, having a bottom 45', and end walls 46 and 47 adapted to provide a thinner or yielding section and to cooperate with the pressure members 54 and/or 54' to limit movement of the expansible locking member into either the advanced or the retracted position.

Pressure members 54 and/or 54' pressing the legs toward the wedge 42' yieldingly grip and hold the locking member 43b in the back or retracted position.

Locking mechanism such as that including the plate 62 is shown with this form of the invention; but it will be understood that this may be left off if desired or the locking mechanism such as that including the cotter member 66 may be used in its place.

If preferred the pressure members may be omitted but then there is the almost certainty of the expansible members 43, 43', and 43b falling out of the associated coupling heads. Thus, it is apparent that the members 54 or 54' serve both to create pressure, and facilitate holding the expansible members in various positions, and also to lock the members against loss from the coupling heads. Also, if preferred only one reduced portion 45 need be provided.

Other variations and modifications may be made within the scope of this invention and portions of the improvements may be used without others.

Having thus described the invention what is claimed as new is:

1. In a coupling head the combination of a body having a main connection and a projecting arm, adapted to be connected to a mating coupling head with a projecting arm; an integral housing on the body having an integral top and integral side walls with a flaring channel extending therealong; a one piece expansible locking member longitudinally reciprocable in the channel, having retracted and advanced positions therein, said channel so constructed that the locking member may be longitudinally inserted into said channel from the smaller end thereof, and means adjacent to the opposite end of the channel for expanding the locking member when the locking member is in advanced position to overlie the projecting arm on the mating coupling head and thereby lock the heads relative to each other.

2. In a coupling head the combination of a body having a main connection and a projecting arm, adapted to be connected to a mating coupling head with a projecting arm; an integral housing on the body, with integral side walls and top forming a main channel; a wedge dividing said main channel into a pair of small channels; a reciprocable and expansible locking member in said channels having retracted and advanced positions, expanded by said wedge, and adapted to overlie the projecting arm on the mating coupling head and thereby lock the heads relative to each other, said locking member having reduced sections; and a pair of removable vertically disposed pressure members engaging the reduced sections to press the locking member onto the wedge.

3. In a coupling head the combination of a body having a main connection and a projecting arm, adapted to be connected to a mating coupling head with a projecting arm; an integral housing on the body, with integral side walls and top forming a main channel; a wedge dividing said main channel into a pair of small channels; a reciprocable and expansible locking member in said channels having retracted and advanced positions, expanded by said wedge, and adapted to overlie the projecting arm on the mating coupling head and thereby lock the heads relative to each other, said locking member having at least one reduced section; and a pair of removable vertically disposed pressure members passing through said housing and into said body, at least one of which engages with the reduced section, adapted to press the locking member into firm engagement with the wedge.

4. In a coupling head the combination of a body having a main connection and a projecting arm, adapted to be connected to a mating coupling head with a projecting arm; an integral housing on the body having an integral top and integral side walls with a main channel extending therethrough; a wedge in said housing dividing said main channel into a pair of small channels; a reciprocable and expansible locking member in said channels having retracted and advanced positions, expanded by said wedge, and adapted to overlie the projecting arm on the mating coupling head and thereby lock the heads relative to each other; and a pair of removable and horizontally disposed pressure members in the side walls of the housing engaging the locking member to press the latter onto the wedge.

5. In a coupling head the combination of a body having a main connection and a projecting arm, adapted to be connected to a mating coupling head with a projecting arm; an integral housing on a body having an integral top and integral side walls having a flaring channel extending therethrough; a wedge in said housing dividing said channel into a pair of small channels; a reciprocable and expansible locking member in said channels having retracted and advanced positions, expanded by said wedge, and adapted to overlie the projecting arm on the mating coupling head and thereby lock the heads relative to each other; and means including at least one removable and horizontally disposed pressure member in the side wall of the housing, engaging the locking member to press the latter onto the wedge.

6. In a coupling head the combination of a body having a main connection and a projecting arm, adapted to be connected to a mating coupling head with a projecting arm; an integral housing on the body having an integral top and integral side walls with a main channel extending therethrough; a wedge in said housing dividing said main channel into a pair of small channels; a reciprocable and expansible locking member in said channels having retracted and advanced positions, expanded by said wedge, and adapted to overlie the projecting arm on the mating coupling head and thereby lock the heads relative to each other; means adapted to hold said locking member in the retracted and/or advanced positions with various degrees of pressure; and means for locking the last means in the various positions.

7. In a coupling head the combination of a body having a main connection and a projecting arm, adapted to be connected to a mating coupling head with a projecting arm; an integral housing on the body having an integral top and integral side walls with a main channel extending therethrough; a wedge in said housing dividing said main channel into a pair of small channels; a reciprocable and expansible locking member in said channels having retracted and advanced positions, expanded by said wedge, and adapted to overlie the projecting arm on the mating coupling head and thereby lock the heads relative to each other; means adapted to hold said locking member in the retracted and/or advanced positions with various degrees of pressure, and to limit travel of the locking member into the retracted and/or advanced positions; and a plate secured to the body adapted to engage and lock said last main means in the various positions.

8. In a coupling head the combination of a body having a main connection and a projecting arm, adapted to be connected to a mating coupling head with a projecting arm; an integral housing on the body with a channel therein; a wedge; a reciprocable and expansible locking member, having retracted and advanced positions, expanded by said wedge; and removable means including at least one horizontally disposed stud in the housing provided with a screw thread for adjustment, engaging the locking member and pressing the latter onto the wedge.

9. In a coupling head the combination of a body having a main connection and a projecting arm, adapted to be connected to a mating coupling head with a projecting arm; an integral housing on the body having an integral top and integral side walls with a main channel extending therethrough; a wedge in said housing dividing said main channel into a pair of small channels; a reciprocable and expansible locking member in said channels having retracted and advanced positions, expanded by said wedge, and adapted to overlie the projecting arm on the mating coupling head and thereby lock the heads relative to each other; and removable means adapted to yieldingly press the locking member onto the wedge, including a vertically disposed pressure member and a horizontally disposed pressure member in said housing respectively passing through the top and side walls of the housing.

GEORGE T. COOKE.